(12) United States Patent
Utaki et al.

(10) Patent No.: US 7,454,891 B2
(45) Date of Patent: Nov. 25, 2008

(54) CABLE PROTECTION AND GUIDE DEVICE

(75) Inventors: Akihiko Utaki, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/856,035

(22) Filed: Sep. 15, 2007

(65) Prior Publication Data

US 2008/0120958 A1    May 29, 2008

(30) Foreign Application Priority Data

Nov. 28, 2006    (JP) .............................. 2006-320801

(51) Int. Cl.
*F16G 13/00*    (2006.01)
(52) U.S. Cl. .............................. 59/78.1; 59/900; 248/49
(58) Field of Classification Search ................. 59/78.1, 59/900; 248/49, 51
See application file for complete search history.

(56) References Cited

U.S. PATENT DOCUMENTS

| | | | | |
|---|---|---|---|---|
| RE35,579 E | * | 8/1997 | Moritz et al. .................. | 59/900 |
| 6,984,782 B2 | * | 1/2006 | Ikeda et al. ................... | 59/78.1 |
| 6,992,254 B2 | * | 1/2006 | Komiya ........................ | 248/49 |
| 7,249,452 B2 | * | 7/2007 | Komiya ........................ | 248/51 |
| 7,310,937 B2 | * | 12/2007 | Kim ............................. | 59/78.1 |

* cited by examiner

*Primary Examiner*—David B Jones
(74) *Attorney, Agent, or Firm*—Woodling, Krost and Rust (57) ABSTRACT

Cable protection and guide devices are susceptible to the generation of wear powders from friction between the cable and front and rear end portions of the connecting plates. The generation of wear powders and damage or disconnection of the cable is prevented and abrasion loss and impact noise due to contact between the side plate units is suppressed. Connecting plates 120 are symmetric such that the inner surface thereof includes small curvature portions, large curvature portions, and a flat surface or approximately flat surface having a radius of curvature which is larger than the large curvature portions.

5 Claims, 11 Drawing Sheets

CABLE PROTECTION AND GUIDE DEVICE

This application claims priority to Japanese Patent Application No. 2006-320801 filed Nov. 28, 2006.

TECHNICAL FIELD

The present invention relates to a cable protection and guide device. Instead of a cable a hose may be employed. Electric power or energy of compressed air is supplied to a movable member of an industrial machine. The cable protection and guide device safely and reliably guides the cable and hose during movement.

BACKGROUND TECHNOLOGY

Figure 11A:
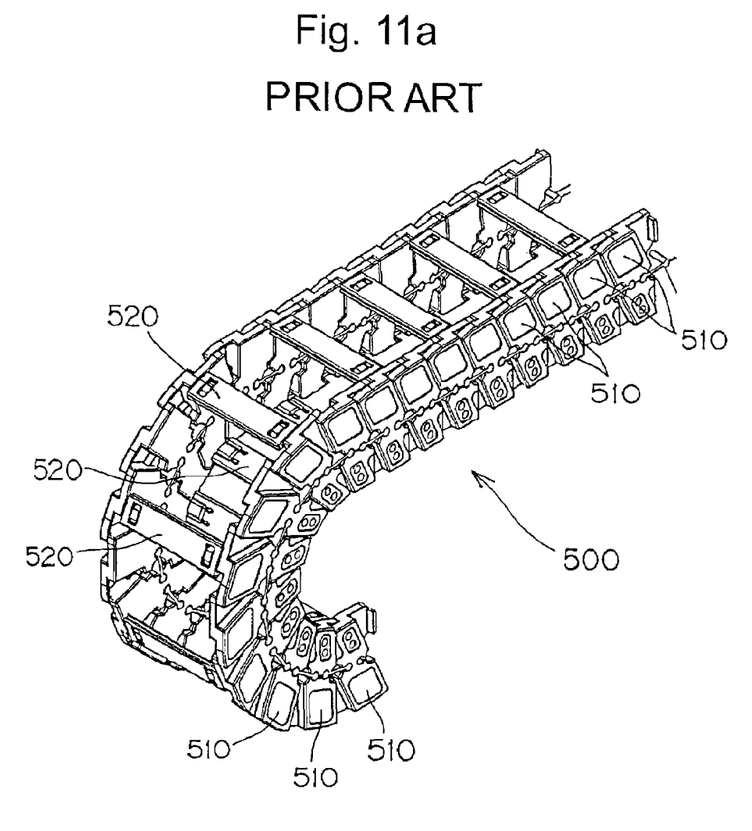
FIG. 11 is a perspective view of a conventional cable or the like protection and guide device.

A conventional cable or the like protection and guide device is shown in FIG. 11(a). A cable or the like protection and guide device 500 is illustrated in which a number of pairs of right and left spaced side plate units 510 are connected to each other from a mounting fixed end toward a mounting movable end. Connecting plates 520 are detachably bridged over flexional inner circumferential sides and flexional outer circumferential sides of said side plate units 510 in predetermined intervals so that a cable or the like is accommodated in a cable accommodating space surrounded by side plate units 510 and connecting plates 520 from the mounting fixed end toward the mounting movable end. See, for example, Japanese Patent Marking Publication No. 2004-527706.

Problems to be Solved by the Invention

Figure 11B:
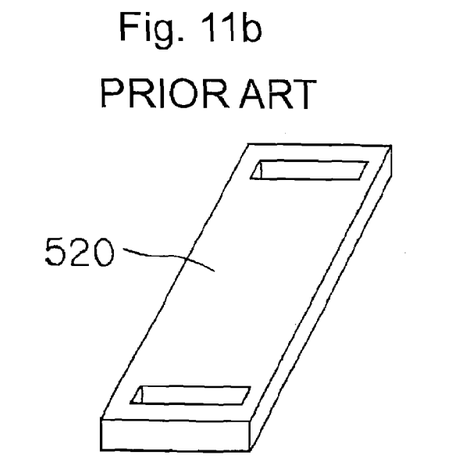

A cable or the like protection and guide device 500 having a connecting plate 520 with curved surfaces has not been previously considered or known. Front and rear end portions of the connecting plate 520 in a direction from a mounting fixed end toward a mounting movable end are formed to be vertical or have an arc of a small curvature which is easy to mold as shown in FIG. 11(b). Contact between the front and rear end portions of the connecting plate 520 and a cable occurred. Thus, with repeated flexure of the device, wear of the cable and generation of wear powders and damage and disconnection of the cable or the like have occurred. Further, other problems such as abrasion loss, impact noise due to sliding contact between front and rear end portions of the connecting plates 520 and/or between the side plate units occurs.

Accordingly, the object of the present invention is to provide a cable or the like protection and guide device in which wear due to contact between the accommodated cable or the like and front and rear end portions of the connecting plates is suppressed. The generation of wear powders and damage or disconnection of the cable or the like is prevented and abrasion loss and impact noise due to contact between the side plate units is suppressed.

Means for Solving the Problems

Thus, the invention solves the above-mentioned problems by a cable or the like protection and guide device. A number of pairs of right and left spaced side plate units are connected to each other from a mounting fixed end toward a mounting movable end and connecting plates are detachably bridged over flexional inner circumferential sides and flexional outer circumferential sides of the side plate units in predetermined intervals. A cable or the like is accommodated in the cable accommodating space surrounded by the side plate units and the connecting plates. The device extends from the mounting fixed end toward the mounting movable end. The invention includes connecting plates which are symmetric with respect to the center vertical line (L). An inner surface of the connecting plates includes a small curvature arc surface, a large curvature arc surface, a flat surface or an arc surface having a curvature larger than said large curvature arc surface, another large curvature arc surface and another small curvature arc surface which extends from the front end portion to the rear end portion of the connecting arm. The inner surface of the connecting plates is a continuous surface comprising the aforementioned arc shaped surfaces.

The invention further solves the above-mentioned problems whereby the side plate unit comprises a side plate front portion connected to a preceding side plate unit and a side plate rear portion connected to a subsequent side plate unit. A flexible coupling portion is integrally intervened between the side plate front portion and the side plate rear portion and an outer circumferential side linear position holding mechanism and an outer circumferential side flexional position limiting mechanism are respectively included on a flexional outer circumferential side plate front portion rather than on said coupling portion. An inner circumferential side flexional position limiting mechanism and an inner circumferential side linear position holding mechanism are respectively included on a flexional inner circumferential side plate rear portion rather than on said coupling portion.

EFFECTS OF THE INVENTION

A cable or the like protection and guide device is disclosed in which a number of pairs of right and left spaced side plate units are connected to each other from a mounting fixed end toward a mounting movable end. Connecting plates are detachably bridged over flexional inner circumferential sides and flexional outer circumferential sides of the side plate units in predetermined intervals so that a cable or the like is accommodated in cable accommodating space surrounded by the side plate units and the connecting plates from the mounting fixed end toward the mounting movable end. The connecting plate is symmetric with respect to the center vertical line. The connecting plate includes an inner surface facing the cable or the like accommodating space. The connecting plate includes, sequentially beginning from either the left or right side thereof, a small curvature arc surface, a large curvature arc surface, a flat surface or substantially flat surface having an arc larger than the large curvature arc surface, a large curvature arc surface and a small curvature arc surface. The surfaces continue from a front end portion to the rear end portion. The inner surface is a continuous surface having the aforementioned surfaces connected to each other. Contact at the large curvature arc surface of the connecting plate between the cable or the like and the connecting plate increases the contact area during flexion. Thus wear of the cable or the like is prevented and the occurrence of wear powders and damage and disconnection of the cable or the like are suppressed.

The cable or the like protection and guide device includes a side plate front portion connected to a preceding side plate, a side plate rear portion connected to a subsequent side plate, and a flexible coupling portion integrally intervened between the side plate front portion and the side plate rear portion. An outer circumferential side linear position holding mechanism and an outer circumferential side flexional position limiting mechanism are respectively included on a flexional outer circumferential side of the side plate front portion rather than the coupling portion. An inner circumferential side flexional position limiting mechanism and an inner circumferential side linear position holding mechanism are respectively included on a flexional inner circumferential side of the side plate rear portion rather than the coupling portion. The coupling portion flexibly responds to repeated flexions so that damage liable to occur in a coupling portion of a side plate unit due to repetition of a flexional operation is removed thus exhibiting excellent fatigue resistance and suppressing the generation of wear powders which renders the device suitable for use in a clean environment.

The side plate respectively includes an outer circumferential side flexion position limiting mechanism on a flexional outer circumferential side of the side plate front portion rather than the coupling portion. The side plate respectively includes an inner circumferential side flexional position limiting mechanism on a flexional inner circumferential side of the side plate rear portion rather than the coupling portion. When the linear position holding state is shifted to the flexional position limiting state, the contact position between adjacent side plate units is divided into two parts of a flexional outer circumferential side and a flexional inner circumferential side, which sandwich the coupling portion. Further, since the side plate respectively includes an outer circumferential side linear position holding mechanism on a flexional outer circumferential side of the side plate front portion rather than the coupling portion and an inner circumferential side linear position holding mechanism on a flexional inner circumferential side of the side plate rear portion rather than the coupling portion, when the flexional position limiting state is shifted to the linear position holding state, the contact position between adjacent side plate units is divided into two parts of a flexional outer circumferential side and a flexional inner circumferential side, which sandwich the coupling portion. Therefore, even if any shift to the flexional position limiting state or the linear position holding state is carried out, the generation of contact impact force is scattered so that noise reduction can be effected.

If the contact area between the cable or the like and front and rear end portions of connecting plates during flexion is increased, wear of the cable is suppressed and the generation of wear powders and damage and disconnection of the cable or the like are suppressed. A number of pairs of right and left spaced side plate units are connected to each other from a mounting fixed end toward a mounting movable end and connecting plates are detachably bridged over flexional inner circumferential sides and flexional outer circumferential sides of the side plate units in predetermined intervals. A cable or the like is accommodated in the cable accommodating space surrounded by the side plate units and the connecting plates. The device extends from the mounting fixed end toward the mounting movable end. The invention includes connecting plates which are symmetric with respect to the center vertical line (L). An inner surface of the connecting plates includes a small curvature arc surface, a large curvature arc surface, a flat surface or an arc surface having a curvature larger than said large curvature arc surface, another large curvature arc surface and another small curvature arc surface which extends from the front end portion to the rear end portion of the connecting arm. The inner surface of the connecting plates is a continuous surface comprising the aforementioned arc shaped surfaces. Any example or embodiment of the present invention, for example, a cable or the like protection and guide device in which individual side plate units are oval and adjacent side plate units are incorporated in an offset state, may be used.

Materials of the side plate, the connecting plate and the like used in the cable or the like protection and guide device of the present invention include engineering plastic resins such as polyamide 6, polyamide 12, polyamide 46, polyamide 66, acryl, polyacetal and the like, which resist flexion strain liable to occur during a flexional operation so that excellent dimensional stability of the cable or the like protection and guide form is exhibited. Particularly, when the above-mentioned members such as the side plate and the connecting plate are made of a fatigue resistant resin material such as an elastomeric or rubber component-formulated polyamide resin or polybutylene terephthalate, the elastomeric or rubber component-formulated polyamide resin or polybutylene terephthalate adds flexibility to enhance impact resistance. These materials exhibit excellent fatigue resistance to repeated flexions. The elastomeric or rubber component-formulated polyamide resin or polybutylene terephthalate is preferred.

And although the connecting plates used in the cable or the like protection and guide device according to the present invention are detachably bridged over the flexional inner circumferential side and the flexional outer circumferential side of the side plates, they may be bridged over every side plate unit or intermittently over some of the side plate units in the longitudinal direction.

DESCRIPTION OF THE INVENTION

A cable or the like protection and guide device 100, which is an example of the present invention, will be described with reference to FIGS. 1 and 10 below.

Figure 1:
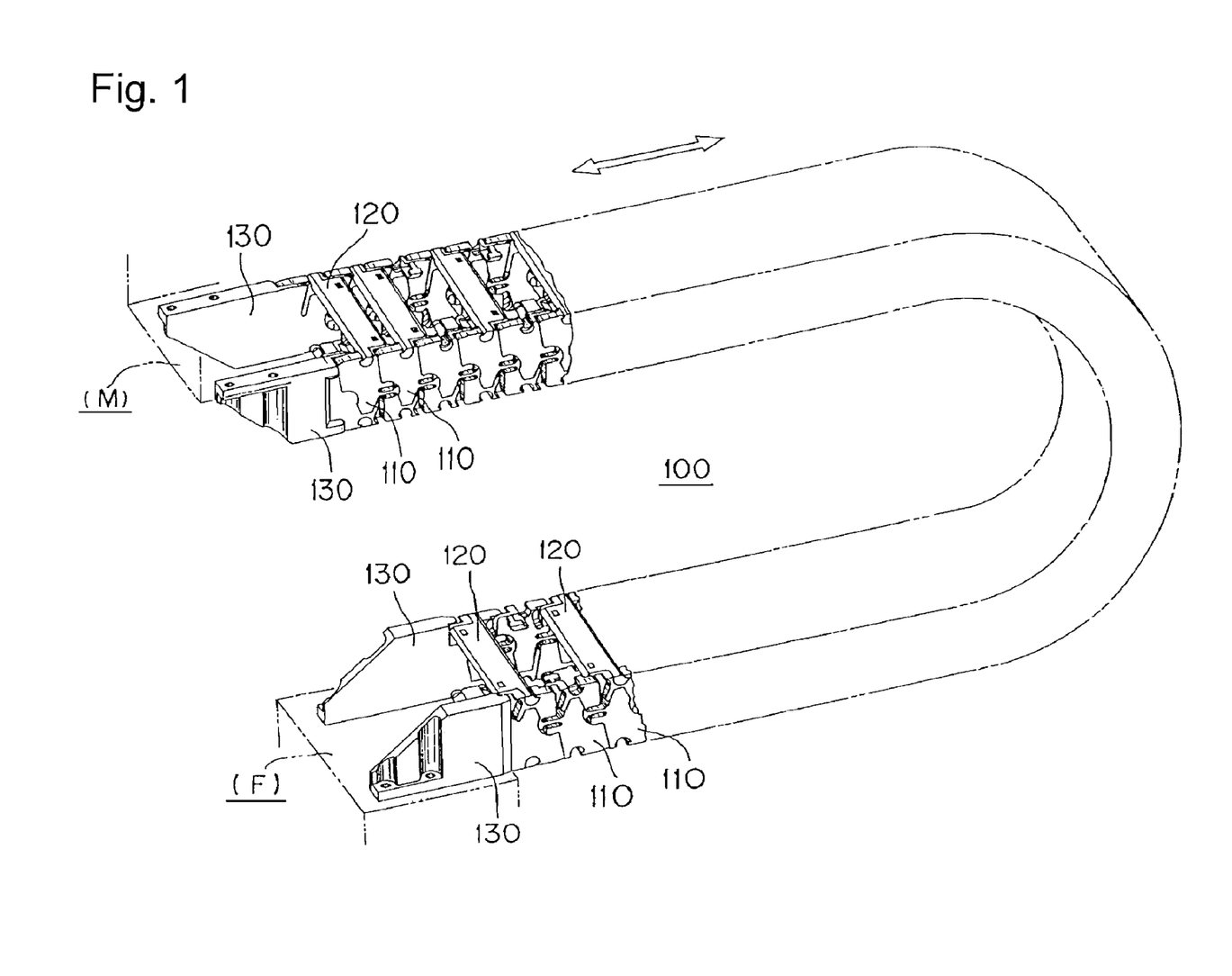
FIG. 1 is an entire view showing a use form of a cable or the like protection and guide device 100, which is an example according to the present invention.
Figure 2:
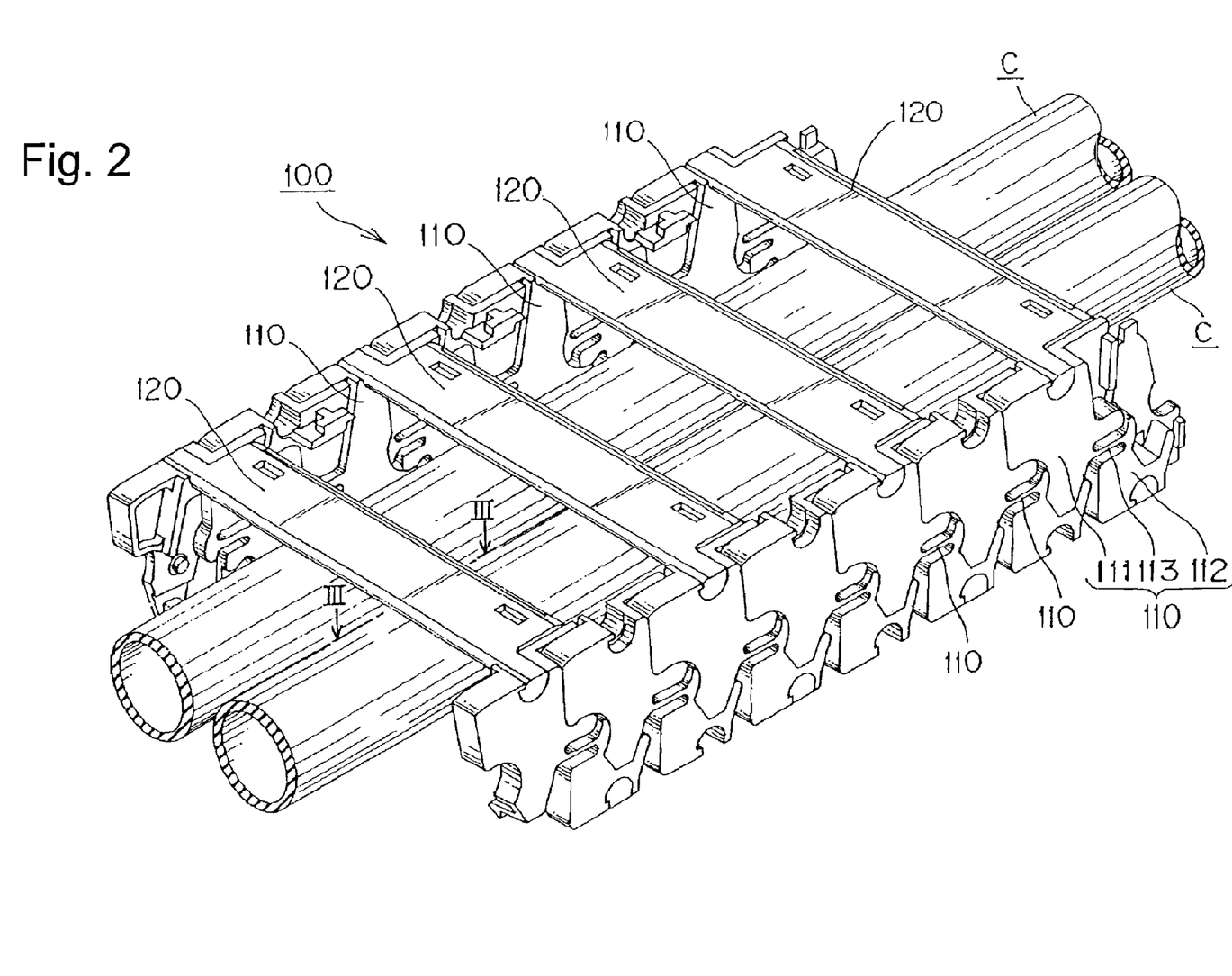
FIG. 2 is an enlarged view of a linear region shown in FIG. 1.
Figure 3:
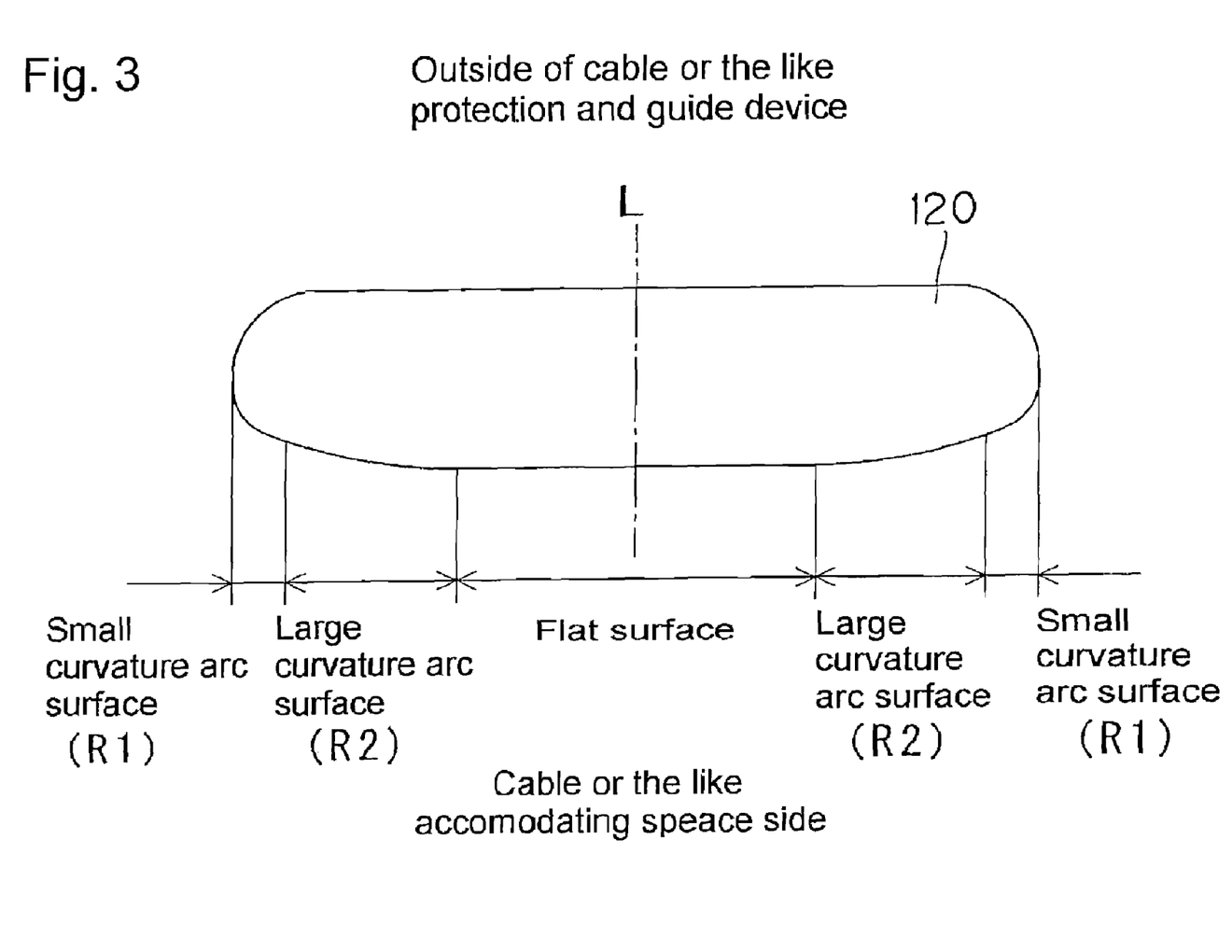
FIG. 3 is a cross-sectional view of a connecting plate taken along the line III-III in FIG. 2.

Here, FIG. 1 is an entire view showing a use of front and rear portions of a cable or the like protection and guide device 100 which is an example according to the present invention. FIG. 2 is an enlarged view of a linear region shown in FIG. 1. FIG. 3 is a cross-sectional view of a connecting plate 120 taken along the line III-III in FIG. 2.

Figure 4:
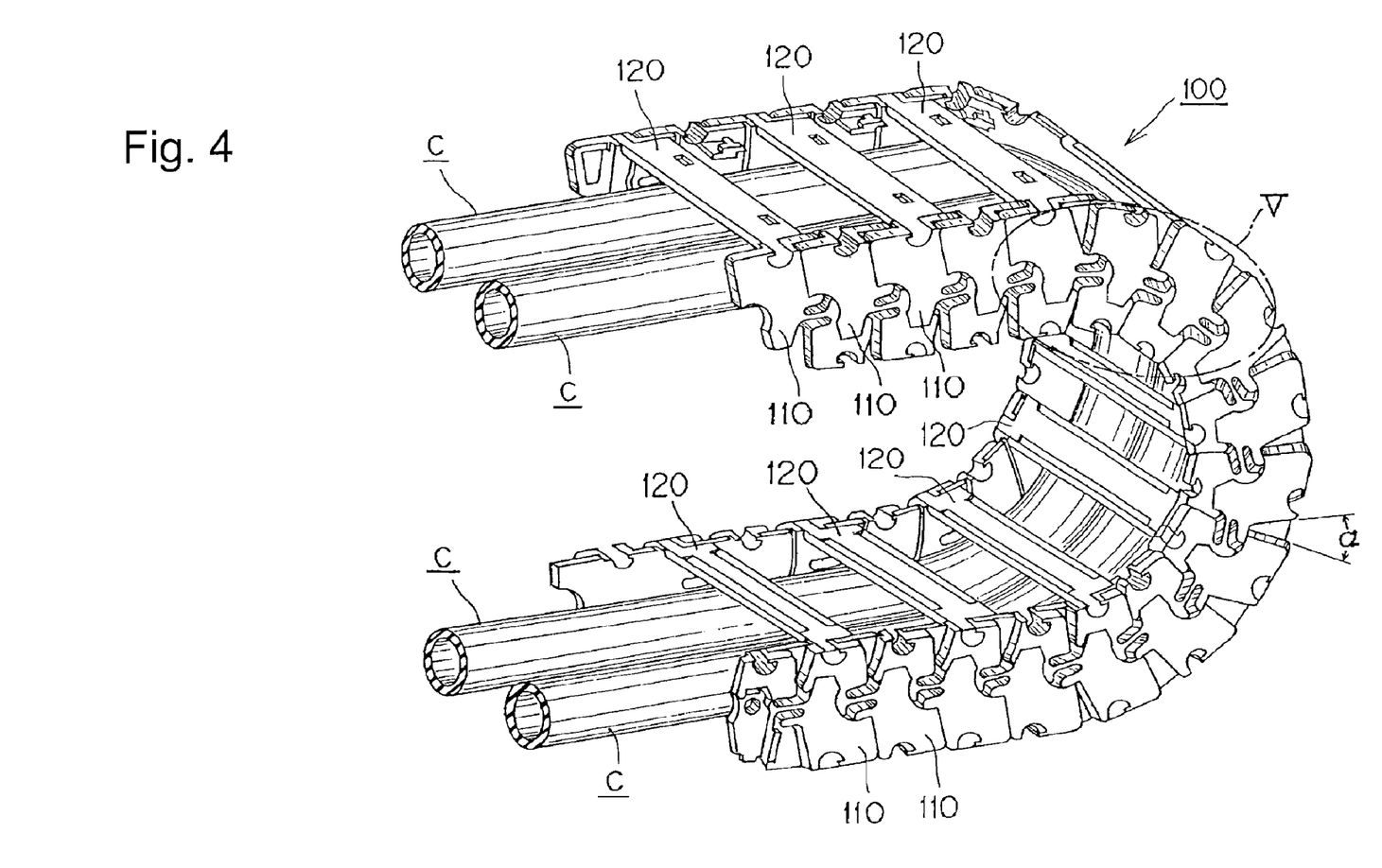
FIG. 4 is an enlarged view of a flexed region shown in FIG. 1.
Figure 5:
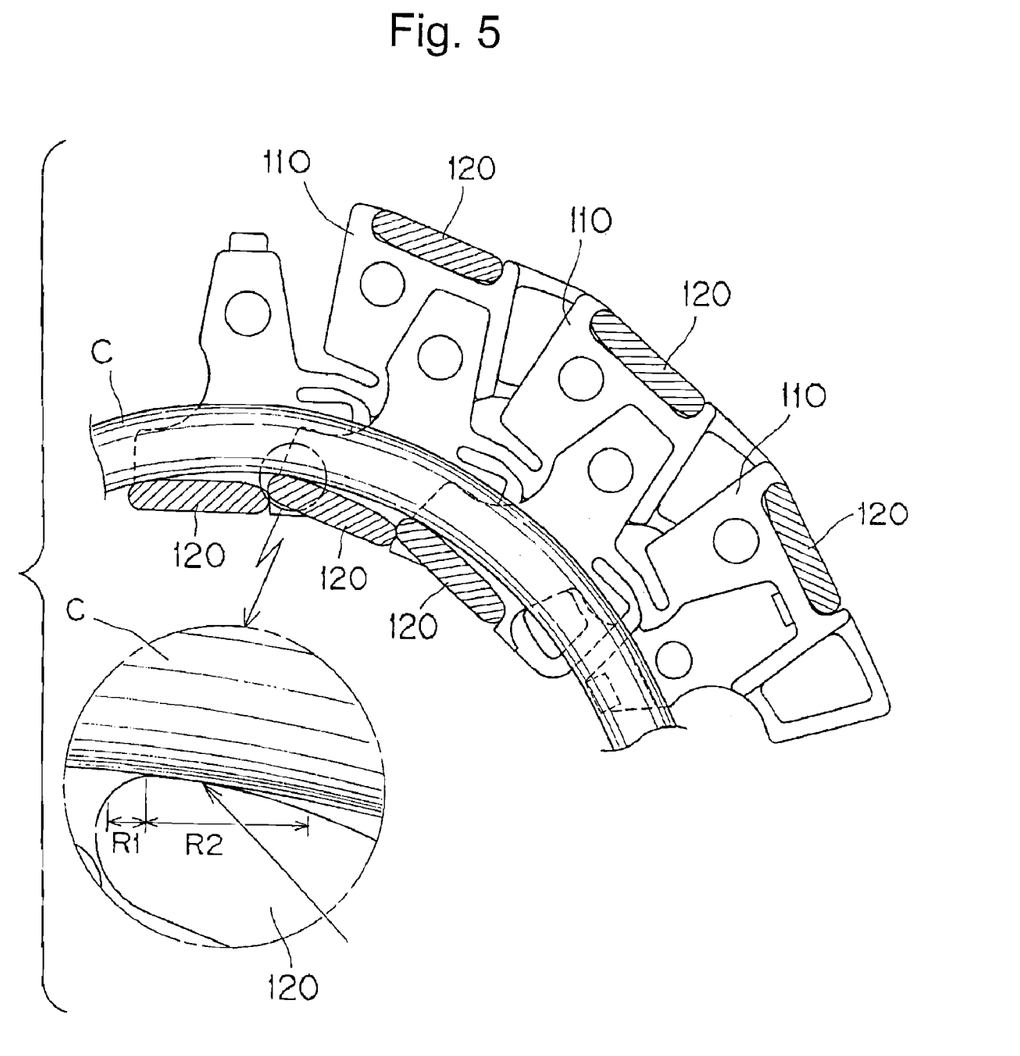
FIG. 5 is a vertical cross-sectional view in the portion V of FIG. 4 and its partially enlarged view.
Figure 6:
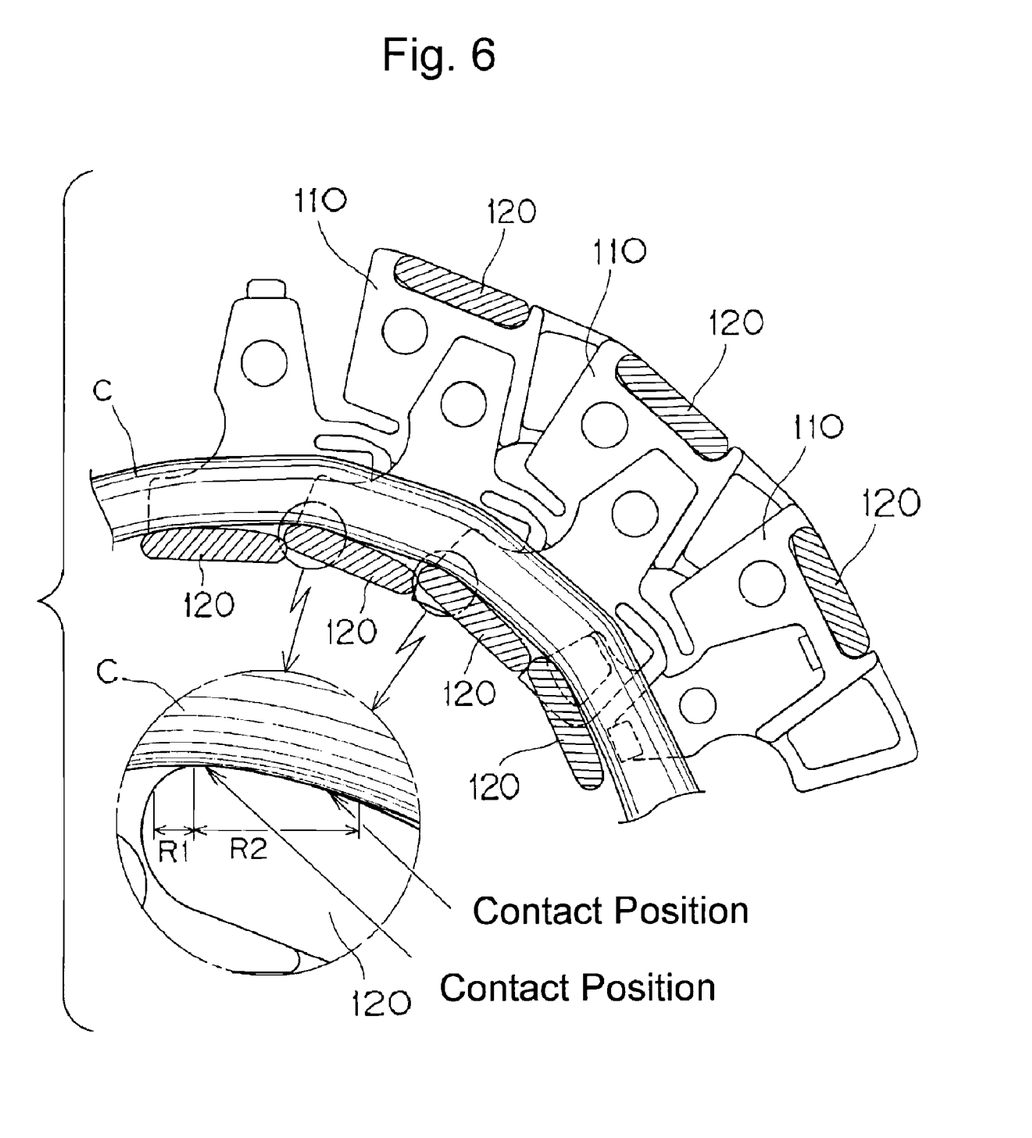
FIG. 6 is a vertical cross-sectional partially enlarged view in the portion V of FIG. 4, in a state where a cable or the like was flexed in a polygonal shape.

FIG. 4 is an enlarged view of a flexed region shown in FIG. 1. FIG. 5 is a vertical cross-sectional view in the portion V of FIG. 4 and its partially enlarged view. FIG. 6 is a vertical cross-sectional partially enlarged view in the portion V of FIG. 4 as in FIG. 5, but this view is a vertical cross-sectional view showing a state where a cable or the like C, which is accommodated article, is subjected to extreme tensile force and the cable or the like C was flexed in a polygonal shape. It is noted that although in FIG. 4 the connecting plates 120 are intermittently bridged over every other side plate 110, FIGS. 5 and 6 show a state where the connecting plates 120 are bridged over every side plate unit 110 for showing the action of the present invention in more detail.

Figure 7:
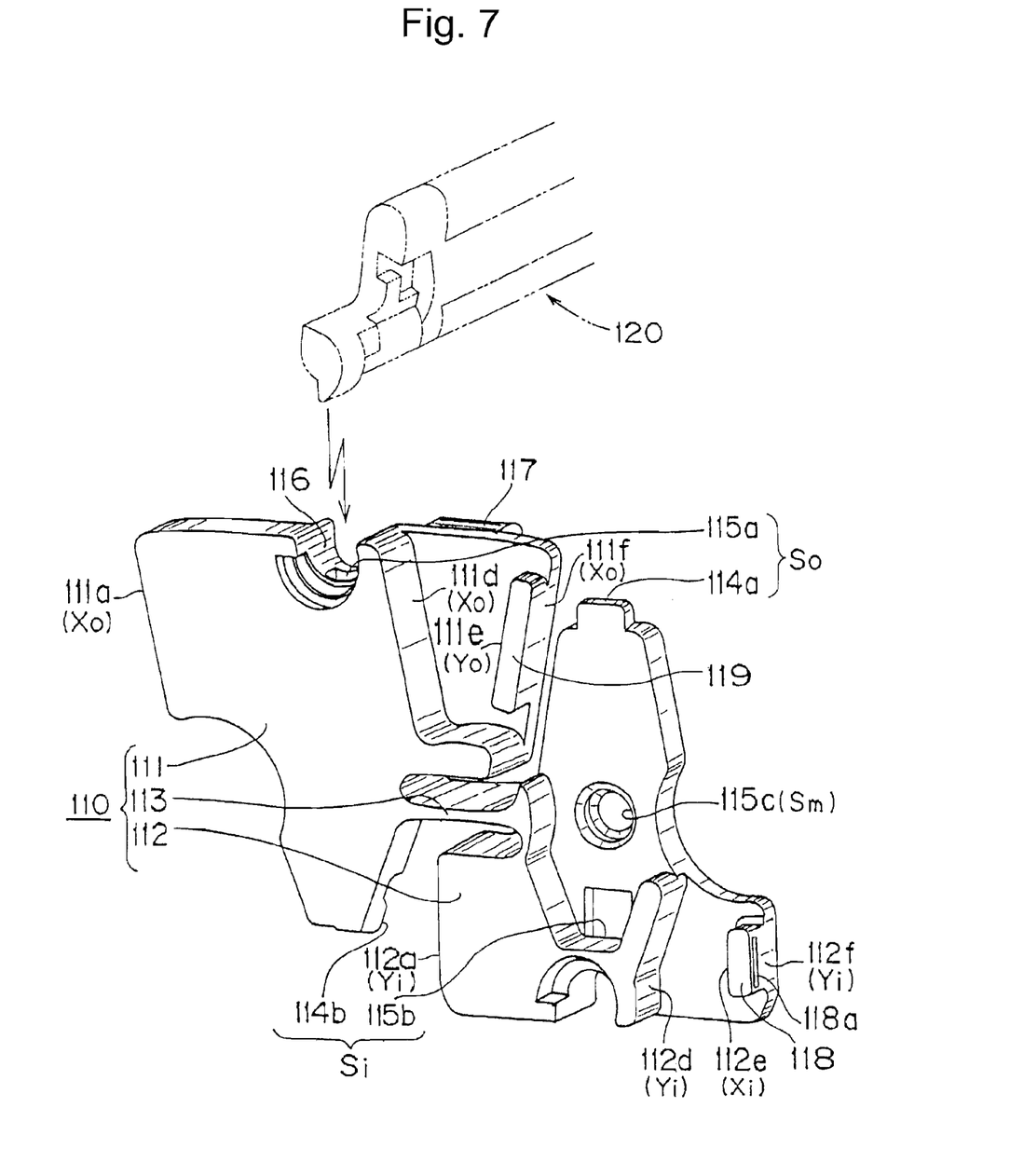
FIG. 7 is a perspective view viewed from the outside of a side plate unit used in the present example.
Figure 8:
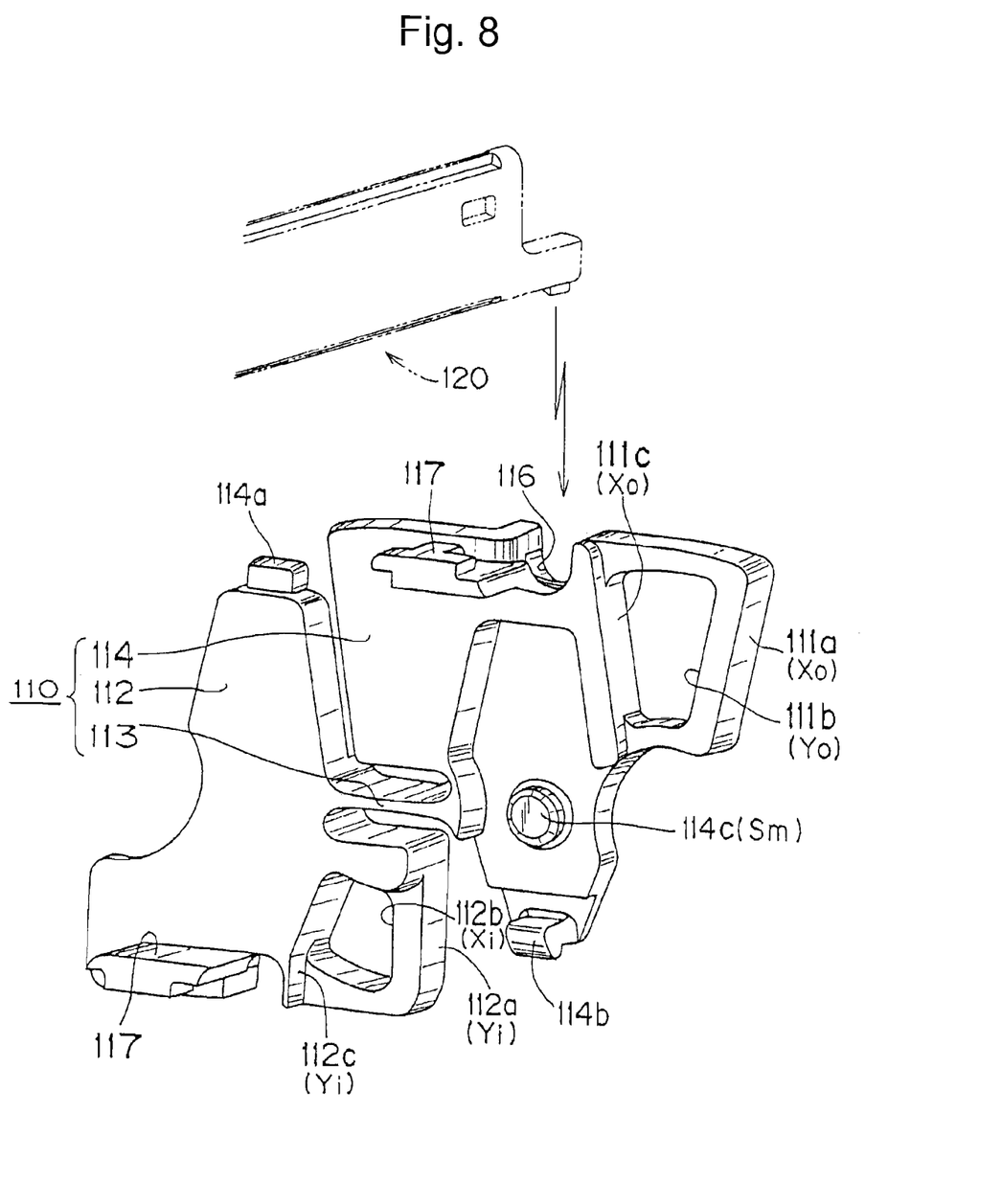
FIG. 8 is a perspective view viewed from the inside of a side plate unit used in the present example.
Figure 9:
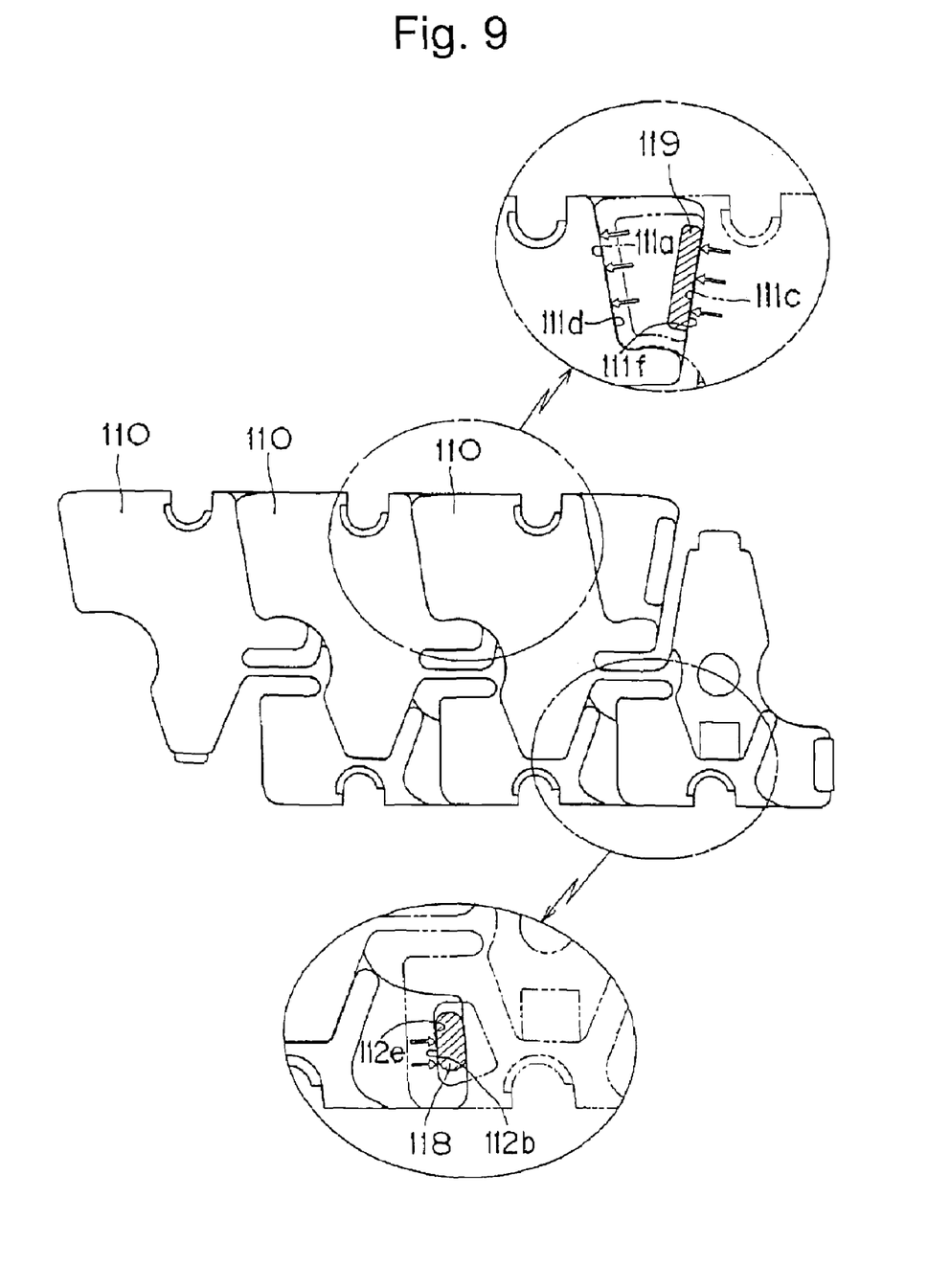
FIG. 9 is a side view explaining a linear position holding state of the side plate units and its partially enlarged view.

FIG. 7 is a perspective view from the outside of the side plate unit 110 used in the present example. FIG. 8 is a perspective view in which a side plate unit 110 used in the example was viewed from a cable or the like accommodating space side. FIG. 9 is a side view explaining a linear position holding state of the side plate units 110 and its partially enlarged view and FIG. 10 is a side view explaining a flexional position limiting state of the side plate units 110 and its partially enlarged view.

The cable or the like protection and guide device 100 of the example of the present invention is used for protecting and guiding cables or the like C such as electric cables which connect between a movable portion and a stationary portion in a semiconductor device, a pharmacy development sample storage device, a door opening/closing device for a vehicle or the like to carry out transmission of electric signals and supply of electric power, and hoses, which supply pressure liquid or pressure gas. The cable protection and guide device is longitudinally connected between the movable portion and the stationary portion (not shown). Further the cable or the like protection and guide device 100 exhibits a linear position or a flexional position in accordance with relatively remote movement conditions between the movable portion and the stationary portion.

As shown in FIG. 1 the cable or the like protection and guide device 100 is formed in such a manner that a number of right and left pairs of spaced plate units 110, 110 are connected to each other in a longitudinal direction of the cable from a mounting fixed end (F) attached to the above-mentioned stationary portion toward a mounting movable end (M) attached to the movable portion. Connecting plates 120 are respectively bridged over flexional inner circumferential sides and flexional outer circumferential sides of these side plate units 110, 110 with alternate arrangement intervals of the side plate units 110, 110 so that a cable (cables) or the like C is accommodated in a cable accommodating space. The cable accommodating space is substantially a rectangular section surrounded by these right and left pair of side plate units 110, 110 and these connecting plates 120, 120 along the longitudinal direction.

It is noted that although in the cable or the like protection and guide device 100 of this example shown in FIG. 2, the connecting plates 120 are bridged in alternate arrangement intervals with respect to the side plate units 110, 110 connected to each other in a large number, for example they may be bridged by the correspondence of 1 to 1 in the respective side plate units 110 connected to each other in a large number as shown in FIGS. 5 and 6.

Further, as shown in FIG. 1, a pair of right and left mounting brackets 140, 140 are detachably connected to a pair of right and left side plate units 110, 110 adjacent to a mounting fixed end (F), and a pair of right and left mounting brackets 130, 130 are detachably connected to a pair of right and left side plate units 110, 110 adjacent to a mounting movable end (M).

FIG. 3 shows a cross-sectional view of a connecting plate 120 in which the connecting plate 120 shown in FIG. 2 was taken along the line III-III. This shape of the section is one of the technical features of the present invention. That is, the connecting plate 120 is molded so that a shape of the section of the connecting plate 120 in a direction from the mounting fixed end (F) toward the mounting movable end (M) is symmetrical with respect to the center vertical line L, a surface of the shape of the section facing said cable or the like accommodating space side is sequentially arranged to be a small curvature arc surface R1, a large curvature arc surface R2, a flat surface or an arc surface having a curvature larger than the large curvature arc surface, a large curvature arc surface R2 and a small curvature arc surface R1 from the front end portion to the rear end portion. The surface, sometimes referred to herein as the inner surface of the connecting plates, is a continuous surface having the aforementioned surfaces connected to each other. Here, the curvature of the large curvature arc surface R2 is smaller than a radius of an arc drawn by the cable or the like C when the cable or the like protection and guide device 100 was flexed to the maximum. The curvature of the small curvature arc surface R1 is smaller than the curvature of the large curvature arc surface R2 and is particularly preferable, for example, the curvature of the small curvature arc surface R1 is about ½ of the thickness of the connecting plate 120 so that the contact area between the cable or the like and the connecting plate 120 during flexion can be increased.

Since the shape of the connecting plate 120 is as described above, there is no corner on a cable or the like accommodating space side of the connecting plate 120. Thus even if the cable or the like protection and guide device C is in any state the connecting plate 120 is brought into surface contact with each other and the cable is difficult to be damaged. Further, as shown in FIG. 5, when the cable protection and guide device is flexed, an arc drawn by the cable or the like C and the large curvature arc surface R2 of the connecting plate are brought into contact with each other and the contact area is increased and the cable is difficult to be damaged. Further, as shown in FIG. 6, when the cable protection and guide device 100 is flexed, the cable or the like C is subjected to a large tensile force. Then even if the cable C is flexed in a polygonal shape along a cable accommodating space it comes into contact with the large curvature arc surface R2 of the connecting plate 12 (as shown in FIG. 6 an enlarged view) and the contact surface pressure can be reduced. Thus the effects of the invention are very large.

A connecting plate 110, which is one of the further technical features of the present invention, will be described in detail. As shown in FIGS. 7 and 8, a pair of right and left spaced side plate units 110, 110 is molded by use of a fatigue resistant material of a rubber component-formulated polyamide resin and is formed symmetrically. And the side plate unit comprises a side plate front portion 111, which is connected to a preceding side plate unit 110, a side plate rear portion 112, which is connected to a subsequent side plate unit 110, and a flexible coupling portion 113 integrally intervened between the side plate front portion 111 and the side rear portion 112.

In this case, since the coupling portion 113 composed of a polyamide rubber composition, which is a fatigue resistant resin, is flexibly adapted to repeated flexions, the cable or the like protection and guide device 100 can exhibit excellent fatigue resistance to repeated flexions. Further, since the side plate front portion 111 and side plate rear portion 112 concentrates and absorbs flexion strain liable to be generated during a flexional operation, the cable or the like protection and guide device 100 can exhibit excellent stability of a cable holding form.

The side plate rear portion 112 of the preceding side plate 110 and the side plate front portion 111 of the side plate unit 110 are subsequently connected. As shown in FIGS. 7 and 8, a flexional outer circumferential side concave portion/convex portion engagement mechanism So comprising a first engagement protrusion 114a and a first hole 115a to be engaged, a flexional inner circumferential side concave portion/convex portion engagement mechanism Si comprising a second engagement protrusion 114b and a second hole 115b to be engaged, and a concave portion/convex portion engagement mechanism Sm comprising a third engagement protrusion 114c and a third hole 115c to be engaged are the vicinity of a coupling portion 113. Side plate units 110, 110 adjacent to each other through these concave portion/convex portion engagement mechanisms So, Si and Sm are attachable to and detachable from each other. Maintenance of the cable or the like protection and guide device 100 can be easily attained during connection and disconnection of the side plate units 110, 110.

That is, the concave portion/convex portion engagement mechanism So on the flexional outer circumferential side of the example of the present invention comprises a horn-shaped first engagement protrusion 114a and a recess-shaped first hole 115a to be engaged, which detachably engages with the engagement protrusion 114a. The concave portion/convex portion engagement mechanism Si on the flexional inner circumferential side comprises a second engagement protrusion 114b composed of a hook-shaped engagement hook and a recess-shaped second hole 115b to be engaged, which detachably engages the engagement protrusion 114b.

The concave portion/convex portion engagement mechanism Sm in the vicinity of a coupling portion 113 of the side plate unit 110 comprises a third engagement protrusion 114c composed of a cylindrical engagement post and a dimple-shaped third hole 115c to be engaged, which detachably engages the engagement protrusion 114c. It is noted that the reference numeral 116 in FIGS. 7 and 8 denotes a fitting shaft hole for mounting the above-mentioned connecting plate 120 onto a side plate unit 110, and the reference numeral 117 denotes a tongue piece supporting portion for supporting a connecting plate 120 mounted onto the side plate unit 110 in a stabilized horizontal state.

Further, as shown in FIGS. 7 to 10, the side plate unit 110 includes an outer circumferential side linear position holding mechanism Xo comprising a first abutment end surface 111a, a third abutment end surface 111c, a fourth abutment end surface 112d and sixth abutment end surface 112f on a flexional outer circumferential side of the side plate front portion 111 rather than on the above-mentioned coupling portion 113. The side plate 110 further includes an inner circumferential side linear position holding mechanism Xi comprising a second abutment end surface 112b and a fifth abutment end surface 112e on a flexional inner circumferential side of the side plate rear portion 112 rather than on the above-mentioned coupling portion 113. Thus when the flexional position limiting state is shifted to the linear position holding state, the contact position between adjacent side plate units 110, 110 is divided into two parts of a flexional outer circumferential side and a flexional inner circumferential side, which sandwich the coupling portion 113.

Further, the side plate unit 110 includes an outer circumferential side flexional position limiting mechanism Yo comprising a second abutment end surface 111b and a fifth abutment end surface 111e on a flexional outer circumferential side of the side plate front portion 111 rather than the above-mentioned coupling portion 113. The side plate 110 further includes an inner circumferential side flexional position limiting mechanism Yi comprising a first abutment end surface 112a, a third abutment end surface 112c, a fourth abutment end surface 112d and a sixth abutment end surface 112f on a flexional inner circumferential side of the side plate rear portion 112 rather than the above-mentioned coupling portion 113. Thus when the linear position holding state is shifted to the flexional position limiting state, the contact position between adjacent side plate units 110, 110 is divided into two parts of a flexional outer circumferential side and a flexional inner circumferential side, which sandwich the coupling portion 113. Therefore, even if any shift to the flexional position limiting state or the linear position holding state is carried out, the contact impact force, which is liable to occur in the adjacent side plate units 110, 110 is scattered, so that noise reduction can be effected.

Figure 10:
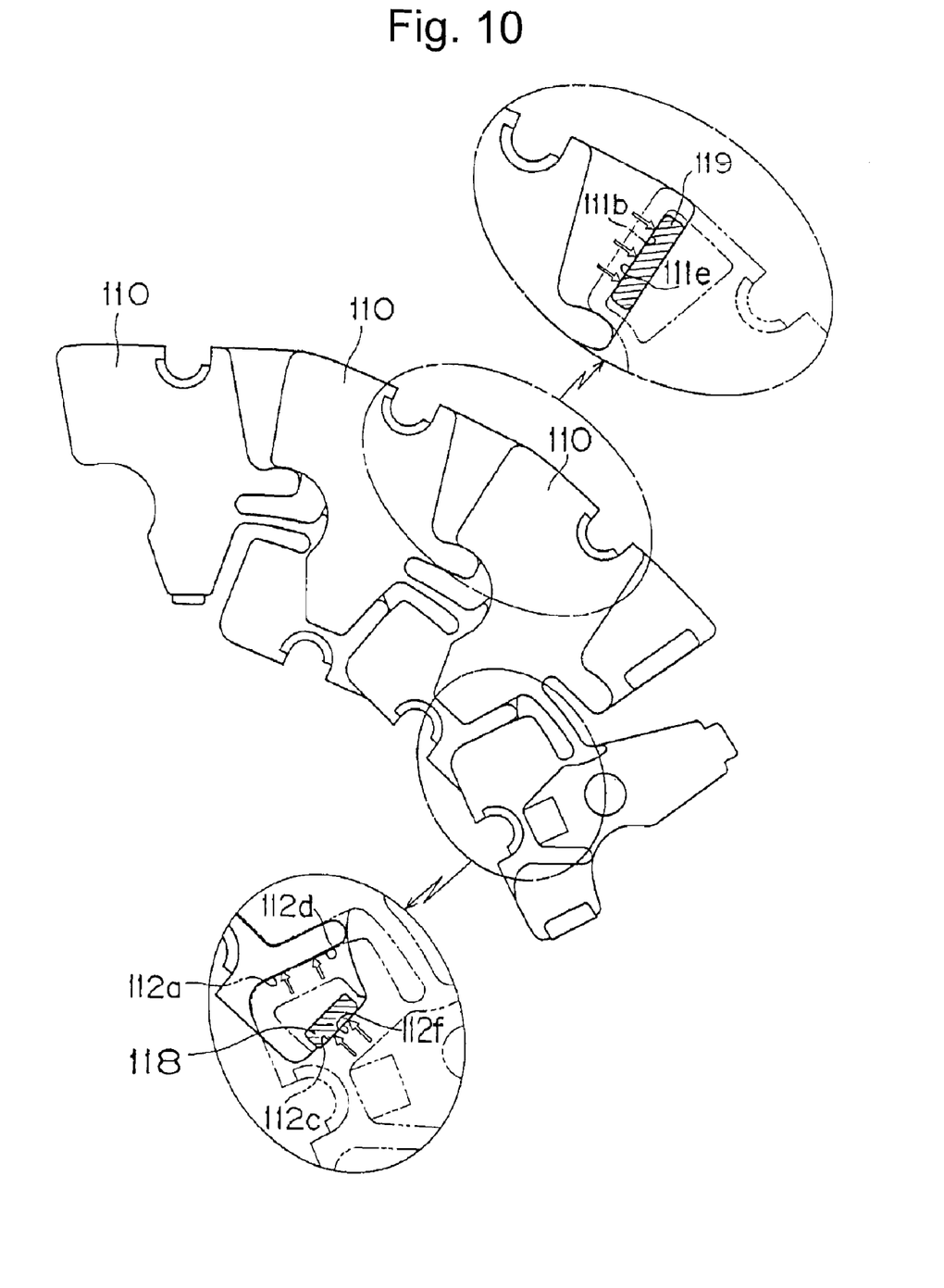
FIG. 10 is a side view explaining a flexional position limiting state of the side plate units and its partially enlarged view.

It is noted that solid lines of partially enlarged views shown in FIGS. 9 and 10 each denote a preceding side plate unit 110 and hypothetical lines therein each denote a subsequent side plate unit 110 and arrows therein each denote pressing force which is impact force generated when adjacent side plate units 110 and 110 abut each other.

That is, as shown in a partially enlarged view of FIG. 9, the outer circumferential side linear position holding mechanism Xo includes the fourth abutment end surface 111d molded on a side plate front portion 111 positioned on a flexional outer circumferential side rather than on the coupling portion 113 of the preceding side plate unit 110. Holding mechanism Xo further includes and operates with the first abutment end surface 111a molded on a side plate front portion 111 of the subsequent side plate unit 110 and the sixth abutment end 111f off-set molded in a stepped fashion on a side plate front portion 111 positioned on a flexional outer circumferential side rather than on the coupling portion 113. Holding mechanism Xo further includes the third abutment end surface 111c which is off-set molded in a stepped fashion on a side plate front portion 111 of the subsequent side plate unit 110.

Further, the inner circumferential side linear position holding mechanism Xi includes the fifth abutment end surface 112e molded on a side plate rear portion 112 of the side plate unit positioned on a flexional inner circumferential side rather than the coupling portion of the preceding side plate unit 110. The linear position holding mechanism Xi extends in a protruding fashion and includes and operates with the second abutment end surface 112b molded on a side plate rear portion 112 of the preceding side plate unit 110.

Inner circumferential side linear position holding mechanism Xi is positioned to abut earlier than the outer circumferential side linear position holding mechanism Xo. When the flexional position limiting state is shifted to the linear position holding state a contact position between the adjacent side plate units is divided into two parts, namely, a flexional outer circumferential side and a flexional inner circumferential side. Contact impact sound generation timing is shifted so that the peak sound and cyclic sound are suppressed and noise reduction is reduced.

Further, the outer circumferential side flexional position limiting mechanism Yo includes the fifth abutment end surface 111e molded on a side plate front portion 111 positioned on the flexional outer circumferential side rather than the coupling portion 113 of the preceding side plate unit 110. Flexional position limiting mechanism Yo further includes and operates with the second abutment end surface 111b molded on a side plate front portion 111 of the subsequent side plate unit 110.

The inner circumferential side flexional position limiting mechanism Yi includes the fourth abutment end surface 112d molded on a side plate rear portion 112 of the side plate unit 110 positioned on a flexional inner circumferential side rather than the coupling portion of the preceding side plate unit 110.

The inner circumferential side flexional position limiting mechanism Yi further includes and operates with the first abutment end surface 112a molded on a side plate rear portion 112 of the subsequent side plate unit 110. The inner circumferential side flexional position limiting mechanism Yi further includes and operates with the sixth abutment end surface 112f molded on a side plate rear portion 112 positioned on a flexional inner circumferential side rather than the coupling portion 113 of the preceding side plate unit 110 in a protruding fashion. The inner circumferential side flexional position limiting mechanism Yi further includes and operates with the third abutment end surface 112c off-set molded in a stepped fashion on a side plate rear portion of the subsequent side plate unit 110.

An inner circumferential side flexional position limiting mechanism Yi is positioned to abut earlier than the outer circumferential side flexional position limiting mechanism Yo. When the linear position holding state is shifted to the flexional position limiting state a contact position between the adjacent side plate units is divided into two parts, namely, a flexional outer circumferential side and a flexional inner circumferential side. Contact impact sound generation timing is shifted so that the peak sound and cyclic sound are suppressed and noise reduction is reduced.

The outer circumferential side linear position holding mechanism Xo and the outer circumferential side flexional position limiting mechanism Yo have larger abutment surfaces than the inner circumferential side linear position holding mechanism Xi and the inner circumferential side flexional position limiting mechanism Yi. When a linear position holding state is shifted to a flexional position limiting state or when a flexional position limiting state is shifted to a linear position holding state, even if large impact force is loaded on an outer circumferential side rather than the inner circumferential side, the contact surface pressure on this large impact force is reduced to the same degree as an inner circumferential side so that a reliable limitation of the flexional position or a reliable holding of the linear position is attained. At the same time wear of the outer circumferential side linear position mechanism Xo and the outer circumferential side flexional position limiting mechanism Yo is prevented.

The inner circumferential side fifth abutment end surface 112e and a sixth abutment end surface 112f of the inner circumferential side linear position holding mechanism Xi and the inner circumferential side flexional position limiting mechanism Yi are, as described above, made of a elastic deformable stopper member composed of a polyamide resin-rubber which is a fatigue resistant resin. Therefore, when the linear position holding state is shifted to the flexional position limiting state or the flexional position limiting state is shifted to the linear position holding state, the contact impact force first loaded on the inner circumferential side is first absorbed by a stopper member 118 so that the contact impact sound is reduced and wear of the stopper member 118 is prevented so that excellent fatigue resistance is exhibited.

Further, stopper member 118 includes a first stopper surface which precedently abuts a second stopper surface (that is a sixth abutment end surface 112f) which abuts more slowly than the first stopper surface 118a. In other words when the linear position holding state is shifted to the flexional position limiting state or the flexional position limiting state is shifted to the linear position holding state, since the first stopper surface 118a, which precedently abuts than the second stopper surface (that is the sixth abutment end surface 112f) is included, the contact impact force loaded on a stopper member 118 is engaged or hits on the first stopper surface 118a and the second stopper surface (that is the sixth abutment end surface 112f) in two steps. Thus a concentrated load of the contact impact force is avoided and excellent fatigue resistance is exhibited and further noise reduction is attained.

It is noted that parts of the above-described outer circumferential side linear position holding mechanism Xo and the outer circumferential side flexional position limiting mechanism Yo are of course respectively formed of a stopper member 119 which includes the outer circumferential fifth abutment end surface 111e and the sixth abutment end surface 111f.

Therefore, since the thus obtained cable or the like protection and guide device 100 of the present example has a large contact area between a cable or the like and a connecting plate during flexion, the wear of the cable or the like is suppressed and the generation of the wear powders and damage and disconnection of the cable or the like are suppressed.

Further, while flexional inner circumferential side flexional position limiting mechanisms Yi and flexional outer circumferential side flexional position limiting mechanisms Yo are respectively mutually widened, flexional outer circumferential side linear position holding mechanisms Xo and flexional inner circumferential side linear position holding mechanisms Xi respectively abut each other in a linear position holding state so that a linear position is reliably held without applying a load on coupling portions 113. At the same time, while flexional outer circumferential side linear position holding mechanisms Xo and flexional inner circumferential side linear position holding mechanisms Xi are respectively mutually widened, flexional inner circumferential side flexional position limiting mechanisms Yi and flexional outer circumferential side flexional position limiting mechanisms Yo respectively abut each other in a flexional position limiting state so that a flexional position is reliably held without applying a load on coupling portions 113. Thus the contact impact sound between side plate units liable to occur during linear position holding and during flexional position limiting when an accommodated cable or the like C travels from a mounting fixed end F toward a mounting movable end M is scattered and suppressed and at the same time excellent fatigue resistance of the side plate unit 110 is exhibited. Thus the effects of the present invention are very large.

INDUSTRIAL APPLICABILITY

According to the present invention, the present inventors have studied and created shapes of sections of connecting plates and shapes of side plate units so that a cable or the like protection and guide device in which wear of the cable or the like is prevented and generation of wear powders and the damage and disconnection of the cable or the like is suppressed. At the same time damage liable to occur in a coupling portion of the side plate unit due to repetition of flexional operations is eliminated and excellent fatigue resistance is attained. The present invention is used, for example, in a semiconductor device, a pharmacy development sample storage device, a door opening/closing device for a vehicle or the like and, as such, the industrial applicability of the present invention is very high.

DESCRIPTION OF REFERENCE NUMERALS

100 . . . Cable or the like protection and guide device
110 . . . Side plate unit
111 . . . Side plate front portion
111a . . . First abutment surface of side plate front portion
111b . . . Second abutment surface of side plate front portion 111c . . . Third abutment surface of side plate front portion
111d . . . Fourth abutment surface of side plate front portion
111e . . . Fifth abutment surface of side plate front portion
111f . . . Sixth abutment surface of side plate front portion
112 . . . . Side plate rear portion
112a . . . First abutment surface of side plate rear portion
112b . . . . Second abutment surface of side plate rear portion
112c . . . Third abutment surface of side plate rear portion
112d . . . Fourth abutment surface of side plate rear portion
112e . . . Fifth abutment surface of side plate rear portion
112f . . . Sixth abutment surface of side plate rear portion
113 . . . Coupling portion
114a . . . Flexional outer circumferential side first engagement protrusion
114b . . . Flexional inner circumferential side second engagement protrusion
114c . . . Third engagement protrusion
115a . . . Flexional outer circumferential side first hole to be engaged
115b . . . Flexional inner circumferential side second hole to be engaged
115c . . . Third hole to be engaged
116 . . . Fitting engagement hole
117 . . . Tongue piece supporting portion
118 . . . Flexional inner circumferential side stopper member
118a . . . First stopper surface
119 . . . Flexional outer circumferential side stopper member
120 . . . Connecting plate
130 . . . Mounting bracket
C . . . Cable (Cables) or the like
L . . . Center vertical line
R1 . . . Small curvature arc surface
R2 . . . Large curvature arc surface
So, Si, Sm . . . Concave portion/convex portion engagement mechanism
Xo . . . Outer circumferential side linear position holding mechanism
Yo . . . Outer circumferential side flexional position limiting mechanism
Xi . . . Inner circumferential side linear position holding mechanism
Yi . . . Inner circumferential side flexional position limiting mechanism
α . . . Maximum widening angle of outer circumferential side flexional position limiting mechanism Those skilled in the art will readily recognize that the invention has been set forth by way of example only and that changes and modifications may be made without departing from the spirit and scope of the invention as claimed hereinbelow.

The invention claimed is:

1. A cable protection and guide device, comprising:
a number of pairs of right and left spaced side plates adjacently and articulately connected to each other in a longitudinal direction enabling said side plates to form a flexional circumferential bend having a flexional inner circumferential side and flexional outer circumferential side;
each of said side plates includes a flexional inner circumferential side residing during bending on said flexional inner circumferential side of said bend;
each of said side plates includes an outer circumferential side residing during bending on said outer flexional circumferential side of said bend;
said number of pairs of right and left spaced side plates are connected to each other from a mounting fixed end toward a mounting movable end;
connecting plates;
each of said connecting plates being symmetrically shaped;
said connecting plates include an inner surface facing said cable accommodating space; said inner surface includes a small curvature surface, a large curvature surface, a substantially flat but slightly curved surface having a curvature larger than said large curvature surface;
said connecting plates detachably bridged over said flexional inner circumferential sides and said flexional outer circumferential sides of said side plates in predetermined intervals;
said side plates and said connecting plates form a cable accommodating space;
a cable is accommodated in said cable accommodating space and is surrounded by said side plates and said connecting plates;
each of said side plates includes: a front portion, a rear portion, and an integral flexible coupling portion between said front portion and said rear portion of each said side plate;
said adjacent side plates interfit each other, said front portion is connected to a rear portion of a preceding side plate, and, said rear portion is connected to a front portion of a subsequent side plate;
each of said front portions of said side plates includes a linear position holding mechanism residing, generally, on said outer circumferential side thereof, said linear position holding mechanism includes outer linear position holding surfaces (Xo);
each of said front portions of said side plates includes a flexional position limiting mechanism residing, generally, on said outer circumferential side thereof, said flexional position limiting mechanism includes outer flexional position limiting surfaces (Yo);
said outer linear position holding surfaces (Xo) residing, generally, on said outer circumferential sides of adjacent plates and interengage each other when said adjacent side plates are not bending thus maintaining said plates in a linear state; and, said outer flexional position limiting surfaces (Yo) residing, generally, on said outer circumferential sides of adjacent plates and interengage each other during bending of said next adjacent plates with respect to each other thus limiting bending of said plates in a bending state;
each of said rear portions of said side plates includes an inner circumferential side flexional position limiting mechanism, residing, generally, on said inner circumferential side thereof, said inner circumferential side flexional position limiting mechanism includes inner flexional position limiting surfaces (Yi);
each of said rear portions of said side plates includes an inner circumferential side linear position holding mechanism residing, generally, on said inner circumferential side thereof, said inner circumferential side linear position holding mechanism includes inner linear holding surfaces (Xi);
said inner flexional position limiting surfaces (Yi) residing, generally, on said inner circumferential sides of adjacent plates and interengage each other during bending of said next adjacent plates with respect to each other; and, said inner linear position holding surfaces (Xi) residing, generally, on said inner circumferential sides of adjacent plates and interengage each other when said adjacent side plates are not bending.

2. A cable protection and guide device as claimed in claim 1 wherein each of said side plates is molded of a fatigue resistant resin material.

3. A cable protection and guide device as claimed in claim 2 wherein said fatigue resistant resin material is an elastomer.

4. A cable protection and guide device as claimed in claim 2 wherein said fatigue resistant resin material is a rubber component-formulated polyamide resin.

5. A cable protection and guide device as claimed in claim 2 wherein said fatigue resistant resin material is a polybutylene terepthalate.

* * * * *